(12) United States Patent
Safai et al.

(10) Patent No.: US 10,663,401 B2
(45) Date of Patent: May 26, 2020

(54) SYSTEM AND METHOD FOR HIGH SPEED LOW NOISE IN-PROCESS HYPERSPECTRAL NON-DESTRUCTIVE EVALUATION FOR RAPID COMPOSITE MANUFACTURING

(71) Applicant: The Boeing Company, Chicago, IL (US)

(72) Inventors: Morteza Safai, Newcastle, WA (US); Gary E. Georgeson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 404 days.

(21) Appl. No.: 15/594,944

(22) Filed: May 15, 2017

(65) Prior Publication Data

US 2018/0328845 A1    Nov. 15, 2018

(51) Int. Cl.
| | |
|---|---|
| *G01N 21/62* | (2006.01) |
| *G01B 11/02* | (2006.01) |
| *G06K 9/20* | (2006.01) |
| *G01B 11/06* | (2006.01) |
| *G01N 21/31* | (2006.01) |

(Continued)

(52) U.S. Cl.
CPC .......... *G01N 21/62* (2013.01); *G01B 11/026* (2013.01); *G01B 11/0683* (2013.01); *G01J 3/18* (2013.01); *G01J 3/32* (2013.01); *G01N 21/314* (2013.01); *G01N 21/8422* (2013.01); (Continued)

(58) Field of Classification Search
CPC .......... G01J 3/44; H01L 31/107; G01N 21/65
See application file for complete search history.

(56) References Cited

U.S. PATENT DOCUMENTS 5,828,452 A    10/1998  Gillispie et al.
7,242,468 B1    7/2007  Zhang
(Continued)

FOREIGN PATENT DOCUMENTS

WO    WO2016088043 A1    6/2016

OTHER PUBLICATIONS

European Patent Office; Extended European Search Report for EP Application No. 18151526.3 dated Jun. 27, 2018.

*Primary Examiner* — Luke D Ratcliffe
(74) *Attorney, Agent, or Firm* — Parsons Behle & Latimer

(57) ABSTRACT

A method may include scanning a surface of a composite workpiece with multiple electromagnetic pulses, each of the multiple electromagnetic pulses being associated with a respective location on the surface of the composite workpiece. The method may further include, for each respective location on the surface of the composite workpiece, receiving a response to one of the multiple electromagnetic pulses at a multi-mode fiber, the response including multiple wavelength components, time shifting the multiple wavelength components with respect to each other by passing the response through the multi-mode fiber to produce a wavelength-binned pulse, sampling the wavelength-binned pulse at time intervals corresponding to the multiple wavelength components to determine a set of wavelength intensity levels corresponding to the multiple wavelength components, and identifying a type or condition of material at the respective location on the surface of the composite workpiece based on the set of wavelength intensity levels.

20 Claims, 5 Drawing Sheets

(51) Int. Cl.
*G01J 3/18* (2006.01)
*G01N 21/84* (2006.01)
*G01J 3/32* (2006.01)
*G01N 21/94* (2006.01)

(52) U.S. Cl.
CPC ........... *G01N 21/94* (2013.01); *G06K 9/2018* (2013.01); *G01N 2021/8472* (2013.01)

(56) References Cited

U.S. PATENT DOCUMENTS

| | | |
|---|---|---|
| 8,836,934 B1 | 9/2014 | Safai et al. |
| 8,947,659 B1 * | 2/2015 | Baastians .............. H01L 31/107 356/301 |
| 2007/0285658 A1 | 12/2007 | Claps et al. |
| 2010/0329671 A1 | 12/2010 | Essiambre et al. |
| 2016/0306108 A1 | 10/2016 | Sun |

* cited by examiner

SYSTEM AND METHOD FOR HIGH SPEED LOW NOISE IN-PROCESS HYPERSPECTRAL NON-DESTRUCTIVE EVALUATION FOR RAPID COMPOSITE MANUFACTURING

FIELD OF THE DISCLOSURE

This disclosure relates generally to contamination identification on a composite structure and more particularly to high speed low noise in-process hyperspectral non-destructive evaluation for rapid composite manufacturing.

BACKGROUND

Hyperspectral cameras may be used effectively to analyze spectral response of structural surfaces, enabling the detection of contaminants, moisture, foreign materials, etc. Systems including these hyperspectral cameras may be used during a manufacturing process for in-process evaluations of composite structures. However, typical hyperspectral cameras require the collection of very large amounts of spectral data at every pixel, or point on a surface of the composite structures. The large amounts of data must be sorted through and analyzed to obtain relevant information. Consequently, image processing time associated with three-dimensional spectral data collected from imaging arrays during a manufacturing process may be slow.

Because of the time involved in image processing, manufacturing goals and inspection goals may not be tenable while taking advantage of typical hyperspectroscopy systems and methods. Further, significant computer resources and cameras including complex hyperspectral imaging arrays are required for typical analysis methods. The hyperspectral cameras may also be susceptible to signal noise produced by ambient light and other sources. Other disadvantages may exist.

SUMMARY

Disclosed is a spectral sensing system that resolves or mitigates at least one of the disadvantages mentioned above. In an embodiment, a method includes scanning a surface of a composite workpiece with multiple electromagnetic pulses, each of the multiple electromagnetic pulses being associated with a respective location on the surface of the composite workpiece. The method further includes, for each respective location on the surface of the composite workpiece, receiving a response to one of the multiple electromagnetic pulses at a multi-mode fiber, the response including multiple wavelength components, time shifting the multiple wavelength components with respect to each other by passing the response through the multi-mode fiber to produce a wavelength-binned pulse, sampling the wavelength-binned pulse at time intervals corresponding to the multiple wavelength components to determine a set of wavelength intensity levels corresponding to the multiple wavelength components, and identifying a type or condition of material at the respective location on the surface of the composite workpiece based on the set of wavelength intensity levels.

In some embodiments, the method includes generating an image of the surface of the composite workpiece indicating the type or condition of material for each respective location on the surface of the composite workpiece. In some embodiments, the method includes identifying anomalies on the surface of the composite workpiece based on the type or condition of material for each respective locations and superimposing graphical indicators of the anomalies on a visible image of the surface of the composite workpiece. In some embodiments, the method includes synchronizing a modulation period of a source of the multiple electromagnetic pulses with a duration of the wavelength-binned pulse for each respective location. In some embodiments, the method includes spatially dispersing the multiple wavelength components using a diffraction grating system before time shifting the multiple wavelength components, and focusing each of the multiple wavelength components into the multi-mode fiber using a lens. In some embodiments, identifying the type or condition of material at the respective location on the surface of the composite workpiece includes comparing the set of wavelength intensity levels to stored wavelength intensity levels associated with pre-selected types or conditions of material. In some embodiments, the method includes, in response to determining that, for each respective location on the surface of the composite workpiece, the type or condition of material excludes contaminants, adding a new layer to the composite workpiece.

In an embodiment, a method includes receiving, at a multi-mode fiber, a response to an electromagnetic pulse directed to a location on a surface of a composite workpiece, the response including multiple wavelength components. The method further includes time shifting the multiple wavelength components with respect to each other by passing the response through a multi-mode fiber to produce a wavelength-binned pulse. The method also includes sampling the wavelength-binned pulse at time intervals corresponding to the multiple wavelength components to determine a set of wavelength intensity levels corresponding to the response. The method includes identifying a type or condition of material at the location on the surface of the composite workpiece based on the set of wavelength intensity levels.

In some embodiments, the method includes identifying additional types or conditions of material at additional locations on the surface of the composite workpiece using the multi-mode fiber, and generating an image of the surface of the composite workpiece that includes graphical indicators indicating the type or condition of material at the location and indicating the additional types or conditions of material at the additional locations. In some embodiments, the method includes synchronizing a modulation period of a source of the electromagnetic pulse with a duration of the wavelength-binned pulse. In some embodiments, the method includes spatially dispersing the multiple wavelength components using a diffraction grating system before time shifting the multiple wavelength components, and focusing each of the multiple wavelength components into the multi-mode fiber using a lens. In some embodiments, identifying the type or condition of material at the location on the surface of the composite includes comparing the set of wavelength intensity levels to stored wavelength intensity levels associated with pre-selected types or conditions of material.

In an embodiment, a spectral sensing system includes a multi-mode fiber configured to receive a response to an electromagnetic pulse directed to a location on a surface of a composite workpiece, the response including multiple wavelength components, and to time shift the multiple wavelength components with respect to each other to produce a wavelength-binned pulse. The system further includes a detector configured to sample the wavelength-binned pulse at time intervals corresponding to the multiple wavelength components to determine a set of wavelength intensity levels corresponding to the multiple wavelength components. The system also includes a processor configured to identify a type or condition of material at the location on the surface of the composite workpiece based on the wavelength intensity levels.

In some embodiments, the processor is further configured to generate an image of the surface of the composite workpiece that indicates the type or condition of material at the location on the surface of the composite workpiece. In some embodiments, the system further includes a source of the electromagnetic pulse, where the source includes a red-green-blue (RGB) laser source, a white light laser source, a light emitting diode source, an arc lamp, or combinations thereof. In some embodiments, a modulation period of the source of the electromagnetic pulse is synchronized with a duration of the wavelength-binned pulse. In some embodiments, the system includes a diffraction grating system for spatially dispersing the multiple wavelength components. In some embodiments, the system includes a lens configured to focus the multiple wavelength components into the multi-mode fiber. In some embodiments, the system includes a mirror system configured to scan the surface of the composite workpiece to enable the multi-mode fiber to receive additional responses for identifying types or conditions of material at additional locations on the surface of the composite workpiece using the multi-mode fiber. In some embodiments, the composite workpiece is a pre-preg ply of an aircraft wing.

Figure 1:
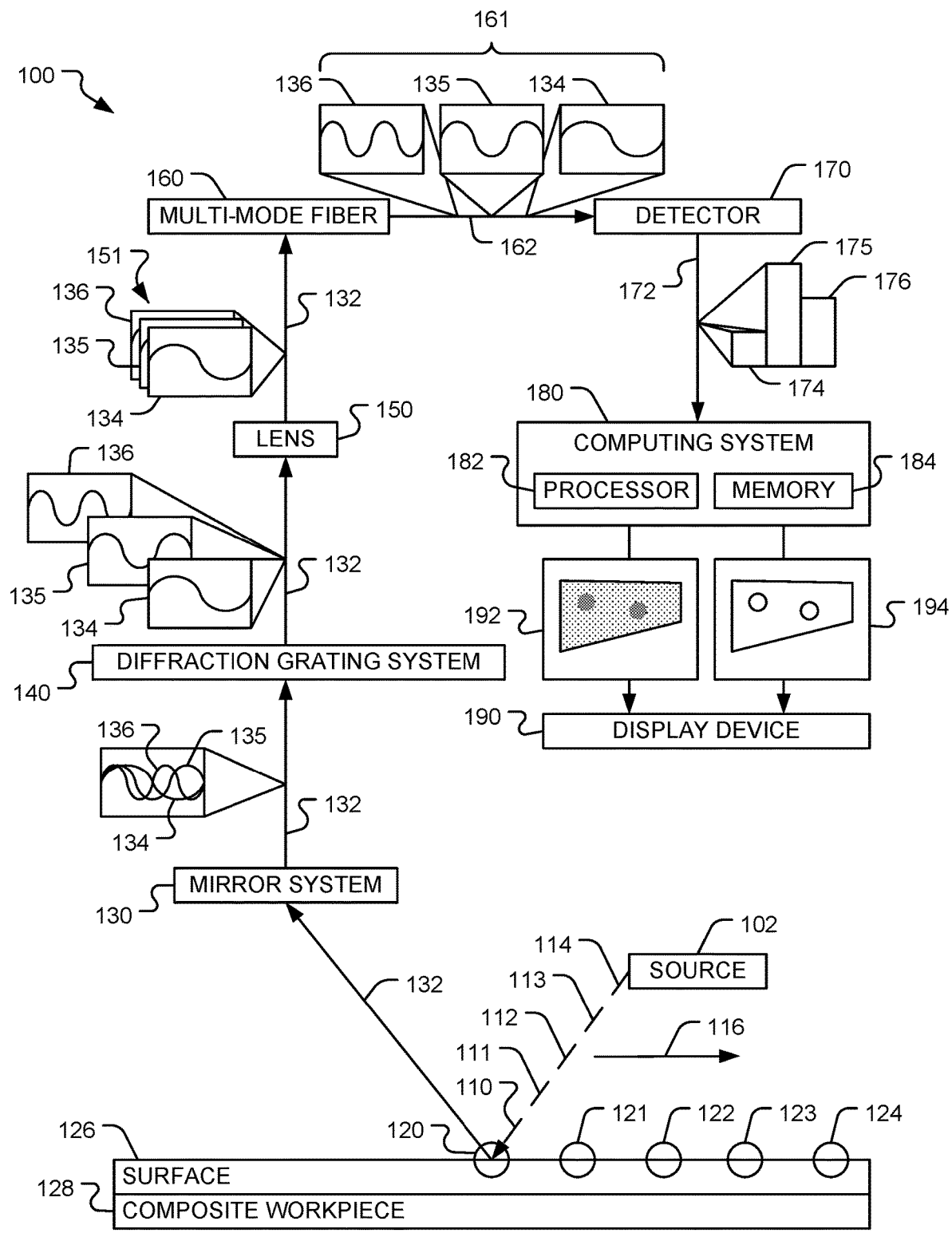
FIG. 1 is a block diagram depicting an embodiment of a spectral sensing system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

The systems and methods disclosed herein may be applied in a composite component manufacturing environment. In particular, the systems and methods disclosed may be used during the manufacturing of aircraft components, including composite wing structures to provide for in-process non-destructive evaluation of the composite wing structures as they are assembled and before being cured. An example of a manufacturing environment suitable for use with the disclosed systems and methods is described in U.S. Pat. No. 8,836,934, filed May 15, 2012 and entitled "Contamination Identification System," the contents of which are herein incorporated by reference in their entirety.

Referring to FIG. 1 of the present disclosure, an embodiment of a spectral sensing system 100 includes an electromagnetic source 102 which may be directed to a surface 126 of a composite workpiece 128, a mirror system 130, a diffraction grating system 140, a lens 150, a multi-mode fiber 160, a detector 170, a computing system 180, and a display device 190.

The source 102 may include any electromagnetic source capable of producing sufficient wavelengths to identify substances of interest on the surface 126 of the composite workpiece 128. For example, the source 102 may include, but is not limited to, red-green-blue (RGB) laser sources, a white light laser source, a light emitting diode (LED) source, an arc lamp, another type of electromagnetic source, or combinations thereof.

As depicted in FIG. 1, the source 102 may be modulated to emit multiple electromagnetic pulses 110-114. The source 102 may further be configured to scan across the surface 126 of the composite workpiece 128 in a direction 116. As the source 102 scans, each of the electromagnetic pulses 110-114 may reflect off the surface 126 at corresponding locations 120-124 on the surface 126 of the composite workpiece 128. For example, a first electromagnetic pulse 110 may be associated with a first location 120, a second electromagnetic pulse 111 may be associated with a second location 121, a third electromagnetic pulse 112 may be associated with a third location 122, a fourth electromagnetic pulse 113 may be associated with a fourth location 123, and a fifth electromagnetic pulse 114 may be associated with a fifth location 124. The methods of spectral sensing are described herein with respect to the first electromagnetic pulse 110 and the first location 120, but is should be understood that the described methods may be performed for each of the electromagnetic pulses 110-114 and their corresponding locations 120-124.

In some embodiments, the composite workpiece 128 may include a component of an aircraft. The surface 126 may generate a response 132 to the first electromagnetic pulse 110 at the first location 120, which may be determined based on the reflective, absorptive, and transmissive properties of the surface 126, as well as the properties of any contaminant materials that may be present on the surface 126.

The response 132 may be directed through the mirror system 130. The mirror system 130 may include any number of mirrors and may be configured to scan the locations 120-124 along with the source 102. Specific examples of a sufficient mirror system are described with reference to U.S. Pat. No. 8,836,934, which has been incorporated herein.

In some embodiments, the source 102 may also be configured to make use of the mirror system 130 for scanning across the surface 126 of the composite workpiece 128. In both cases, the mirror system 130 may be configured to direct the response 132 of the electromagnetic pulse 110 into the diffraction grating system 140 while the electromagnetic pulse 110 is directed to the location 120.

The response 132 may include multiple wavelength components 134-136. For example, the response 132 may include a first wavelength component 134, a second wavelength component 135, and a third wavelength component 136. While the response 132 is depicted as including three wavelength components, persons of ordinary skill in the art understand that wavelength is a continuous parameter, such that the response 132 may include any number of wavelength components. Further, the response may include noise, such as from ambient lighting or other sources within a production environment of the composite workpiece 128.

The diffraction grating system 140 may include any number of diffraction gratings to spatially disperse the wavelength components 134-136 from each other. The diffraction grating system 140 may further function to filter wavelengths that are not used for the spectral sensing. For example, some wavelengths may not be needed to identify materials and contaminants on the surface 126 of the composite workpiece 128. These wavelength components may be ignored by the diffraction grating system 140 or may otherwise not pass through the diffraction grating system 140. After passing through the diffraction grating system 140, the wavelength components 134-136 of the response 132 may be spatially dispersed from each other. The lens 150 may then focus each of the spatially dispersed wavelength components 134-136 into the multi-mode fiber 160 as shown in FIG. 1 at reference number 151.

The multi-mode fiber 160 may be selected based on its modal dispersion properties including its ability to time-shift signals having different wavelengths. In general, multi-mode fibers cause wavelength-dependent time-shifting due to different wavelengths passing through the multi-mode fiber 160 at different speeds. While the speed of light is the same for each of the wavelength components, due to differing indices of refraction, the distances travelled by each of the wavelengths through the multi-mode fiber 160 differ. As such, the amount of time-shifting that occurs between wavelengths within the multi-mode fiber 160 depends on a number of factors including the index of refraction of the multi-mode fiber cladding, the particular wavelengths of interest, a diameter of the multi-mode fiber 160, a length of the multi-mode fiber 160, and other features and properties of the multi-mode fiber 160. In the system 100, each of these features of the multi-mode fiber 160 may be selected in order to spread the wavelength components 134-136 as shown in FIG. 1 at reference number 161.

For example, the multi-mode fiber 160 may time-shift the wavelength components 134-136 of the response 132 from each other as each of the wavelength components 134-136 pass through the multi-mode fiber 160 at a different speed. The result is an expanded wavelength-binned pulse 162 that includes each of the wavelength components 134-136 sorted over time.

The detector 170 may be timed to sample the wavelength components 134-136 separately. For example, as each of the wavelength components 134-136 arrives at the detector 170 after a respective interval, the detector 170 may sample the arriving wavelength component. In the system 100, the detector 170 may include any electromagnetic detector capable of detecting the wavelength components 134-136. For example, the detector 170 may include, but is not limited to, a complementary metal-oxide semiconductor (CMOS) detector, a charge-coupled device (CCD) detector, another type of electromagnetic detector, or combinations thereof.

While some systems may include complex detector arrays for spectral imaging, the detector 170 may include fewer, or a single, detector because each of the wavelength components 134-136 arrives at the detector 170 at a different time. The modulation of the source 102 may be synchronized with the wavelength-binned pulse 162 in order to prevent the electromagnetic pulses 110-114 from producing interfering wavelength-binned pulses and to enable the continuous sampling of the detector 170 as the surface 126 is scanned. The timing and synchronization of the detector 170 and the source 102 is further described with reference to FIG. 3.

Based on the samplings, the detector 170 may produce a set of wavelength intensity levels 174-176 associated with each of the wavelength components 134-136. For example, the wavelength intensity level 174 may be associated with the wavelength component 174, the wavelength intensity level 175 may be associated with the wavelength component 175, and the wavelength intensity level 176 may be associated with the wavelength component 176. The set of wavelength intensity levels 174-176 may be collectively referred to as a signature 172.

The signature 172 may be analyzed at the computing system 180. For example, the computing system 180 may include a processor 182 and memory 184. In general the memory 184 may include instructions that, when executed by the processor 182, cause the processor 182 to identify a type or condition of material at the first location 120 based on the set of wavelength intensity levels 174-176. This process is described in more detail herein with reference to FIG. 2.

After a type or condition of material is identified at the first location 120, additional types or conditions of material may be identified at the remaining locations 121-124 using responses to their corresponding electromagnetic pulses 111-114. As the source 102 scans the surface 126 of the composite workpiece 128, an image 192 may be generated that maps each of the locations 120-124 to a corresponding type or condition of material. The image 192 may be sent to the display device 190 for view by an operator. The operator may identify contaminants or other anomalies based on the image 192.

In some embodiments, anomalies, which may include contaminants, may be automatically identified by the processor 182 based on the image 192. The processor 182 may generate another image 194 that superimposes graphical indicators of the anomalies on a visible image of the surface 126 of the composite workpiece 128. The other image 194 may be sent to the display device 190 to enable an operator to locate and correct anomalies that exist on the composite workpiece 128. The generation of the images 192, 194 is further described with reference to FIG. 2.

A benefit of the system 100 is that by sorting and binning the wavelength components 134-136 while in a propagating signal before detection by the detector 170, fewer computing resources may be used to perform a spectral analysis on the response 132 as compared to systems that do not sort and bin wavelength components before detection. Further, the amount of time devoted to image processing may be greatly reduced, enabling the system 100 to be applied to an in-process non-destructive evaluation without substantially slowing down the manufacturing process. Further, because the sorted and binned wavelength components 134-136 reach the detector 170 one-at-a-time, only a single detector 170 may be employed as compared to other systems that include a full spectral detector array to accumulate sufficient spectral imaging data. Thus, the system 100 may be greatly simplified as compared to other spectral analysis systems.

Another benefit of the system 100 is that, because the multi-mode fiber 160 time-shifts the response 132 based on wavelength, noise within the response (e.g., from ambient light or other sources) may be automatically and substantially removed from the binned wavelength components 134-136. Thus, the system 100 may include fewer resources devoted to noise reduction as compared to other spectral analysis system. Other benefits of the system 100 may exist.

Figure 2:
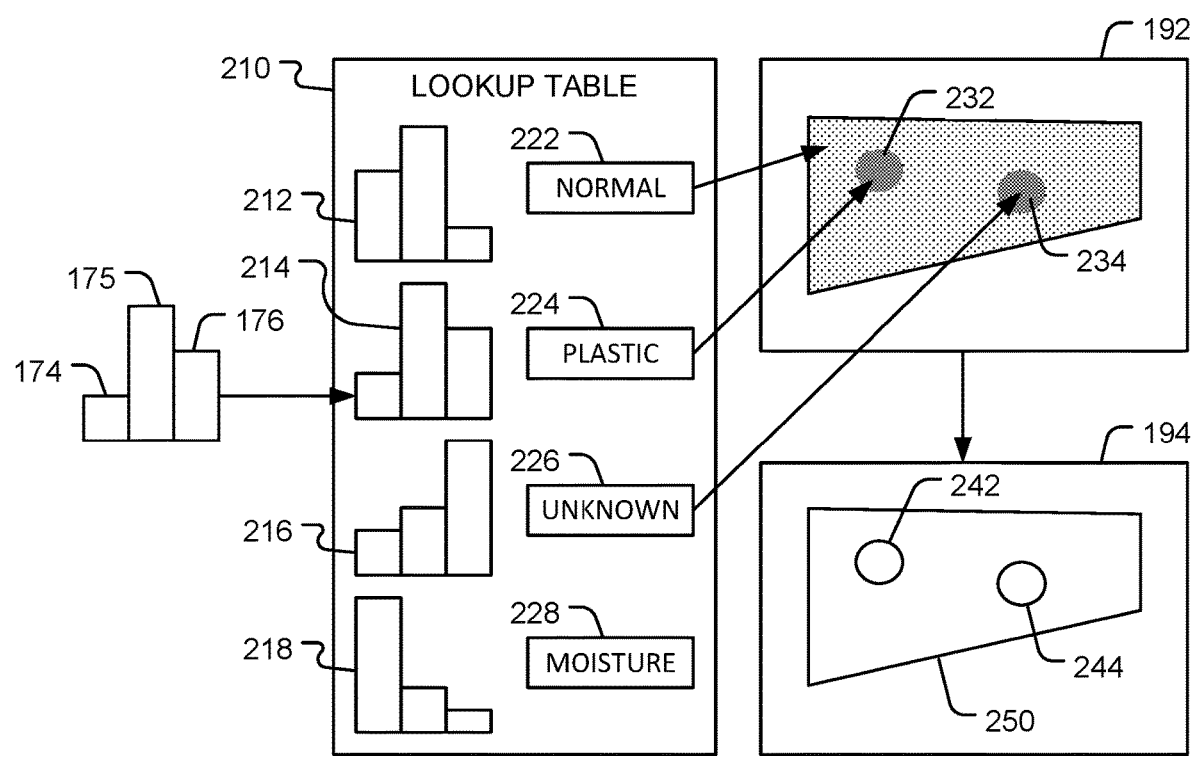
FIG. 2 is a diagram depicting an embodiment of a lookup table for use with an embodiment of a spectral sensing system.

Referring to FIG. 2, a lookup table 210 is described. The lookup table 210 may be stored at the memory 184 and may be used by the processor 182 of FIG. 1 to identify types or conditions of materials based on the wavelength intensity levels 174-176. In some embodiments, the lookup table 210 may be stored at a database separate from the memory 184.

As used herein, the lookup table may include any data structure or data system that maps material signatures to types of materials.

The lookup table 210 may include stored data corresponding to multiple signatures or sets of wavelength intensity levels 212-218. Each of the stored sets of wavelength intensity levels 212-218 may correspond to respective types or conditions of material 222-228. For example, a first set of wavelength intensity levels 212 may correspond to a first type or condition of material 222, a second set of wavelength intensity levels 214 may correspond to a second type or condition of material 224, a third set of wavelength intensity levels 216 may correspond to a third type or condition of material 226, and a fourth set of wavelength intensity levels 218 may correspond to a fourth type or condition of material 228.

In the depicted embodiment, the first type or condition of material 222 is normal, e.g., a composite material used to construct the composite workpiece 128 under normal conditions. The second type or condition of material 224 is plastic. The third type or condition of material 226 is unknown, e.g., indicating an unknown contamination or condition. The fourth type of material or condition 228 is moisture, e.g., a wet condition. While FIG. 2 only depicts four types of materials or conditions, more or fewer than four may be included in the lookup table 210. Further, plastic materials, unknown materials, and moisture may be considered contaminants while normal materials are part of the normal structure of the composite workpiece 128.

The lookup table 210 may be used to compare the set of wavelength intensity levels 174-176 to the stored sets of wavelength intensity levels 212-218, which may then be mapped to a type of material or condition. For example, the set of wavelength intensity levels 174-176 are mapped to the second type of material or condition 224, or plastic. Each location of the surface 126 of the composite workpiece 128 may be scanned to determine the type of material or condition. The image 192 may be generated and may include graphical indicators, such as shading or color, to indicate the material present at each of the locations. For example, locations that are mapped to plastic materials may be shaded a first shade 232 that differs from locations that are mapped to unknown materials, which may be shaded a second shade 234.

In some embodiments, the analysis may be taken further by generating another image 194. The other image 194 may include a visual image 250 of the surface 126 of the composite workpiece 128. Graphical indicators 242, 244 may be superimposed on the visual image 250 to show an operator the location of anomalies on the composite workpiece 128, enabling the operator to remove the anomalies before continuing a manufacturing process.

Figure 3:
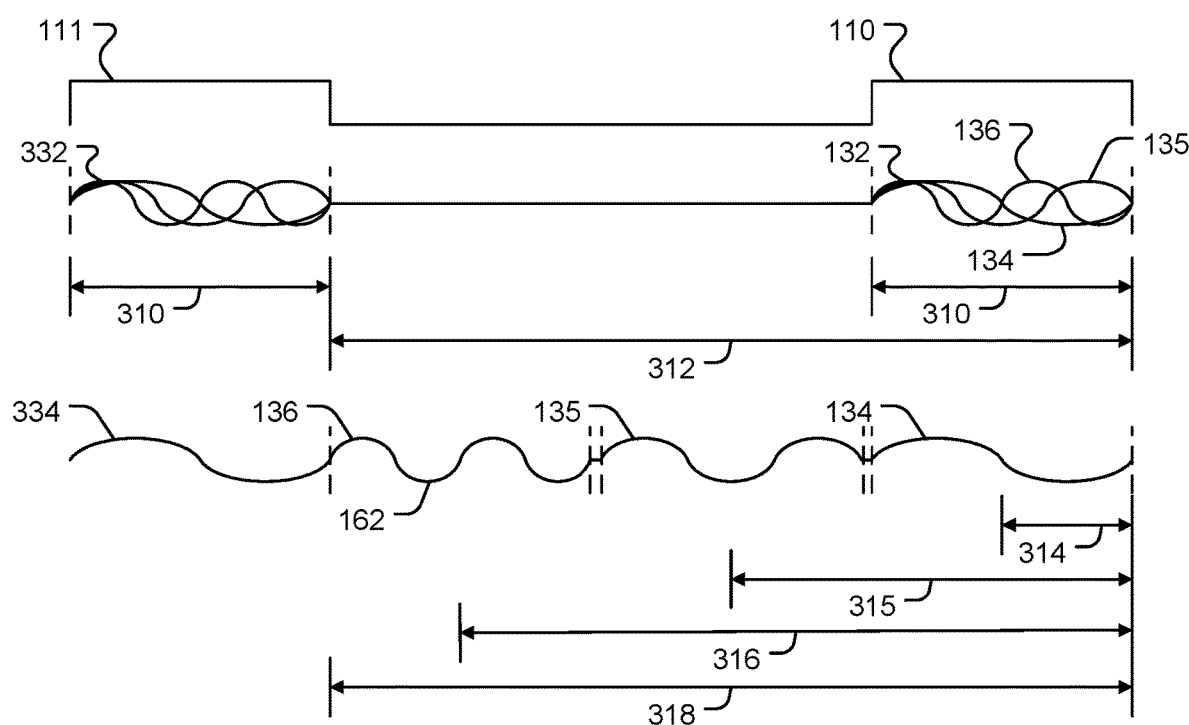
FIG. 3 is a diagram depicting timing schemes for electromagnetic pulses for use with an embodiment of a spectral sensing system.

Referring to FIG. 3, a timing diagram depicts the electromagnetic pulse 110 and the electromagnetic pulse 111. The diagram may be conceptualized as traveling from left to right, such that the electromagnetic pulse 110 occurs before the electromagnetic pulse 111. In FIG. 3, the electromagnetic pulses 110, 111 are depicted as a square wave to illustrate the modulation of the source 102 of FIG. 1. As discussed herein, the source 102 may scan the surface 126 such that the electromagnetic pulse 110 may be directed at the first location 120 of the surface 126 and the electromagnetic pulse 111 may be directed at the second location 121 of the surface 126.

Contact between the electromagnetic pulse 110 and the surface 126 may result in creating the response 132. Likewise, subsequent contact between the electromagnetic pulse 111 and the surface 126 may results in the response 332. The response 132 may include the multiple wavelength components 134-136 and the response 332 may also include multiple wavelength components. As depicted in FIG. 3, each of the electromagnetic pulses 110, 111 and the responses 132, 332 may have the same duration 310, which may be less than a modulation period 312 of the electromagnetic source 102.

After the response passes through the multi-mode fiber 160, each of the wavelength components 134-136 are time-shifted with respect to each other based on their respective wavelengths to produce the wavelength-binned pulse 162. The individual wavelength components 134-136 may then be sampled at intervals specific to the particular wavelength component. For example, the first wavelength component 134 may be sampled after a first interval 314, the second wavelength component 135 may be sampled after a second interval 315, and the third wavelength component 136 may be sampled after a third interval 316. Each of the intervals 314-316 correspond to times when the wavelength components 134-136 will reach the detector 170. Although each of the intervals 314-316 are depicted as extending to the center of each of the wavelength components 134-136, in other embodiments, the intervals 314-316 may extend to any point within the corresponding wavelength components 134-136. The response 332 also may be passed through the multi-mode fiber 160 as well and sampled in a similar manner. Only a first wavelength component 334 of the second response 332 is depicted in FIG. 3.

After being time-shifted, the wavelength-binned pulse 162 may have a duration 318 that is longer than the duration 310 of the response 132 due to spreading. The modulation period 312 may be synchronized with the duration 318 of the wavelength-binned pulse 162 so that the third wavelength component 136 of the wavelength-binned pulse 162 does not interfere with the first wavelength component 334 associated with the second electromagnetic pulse 111.

It should be noted that the timing depicted in FIG. 3 is not to scale. Each wavelength component 134-136 may be spread more or less than depicted in the example of FIG. 3. Further, as previously stated, more or fewer than three wavelength components may be analyzed as part of the response 132.

A benefit of the timing depicted in FIG. 3 is that by synchronizing the modulation period 312 with the duration 318, the wavelength components 134-136 associate with the first electromagnetic pulse 110 may not interfere with the wavelength component 334 associated with the second electromagnetic pulse 111. Further, the responses 132, 332 may be continuously analyzed without long time periods therebetween. Other benefits and advantages may exist.

Figure 4:
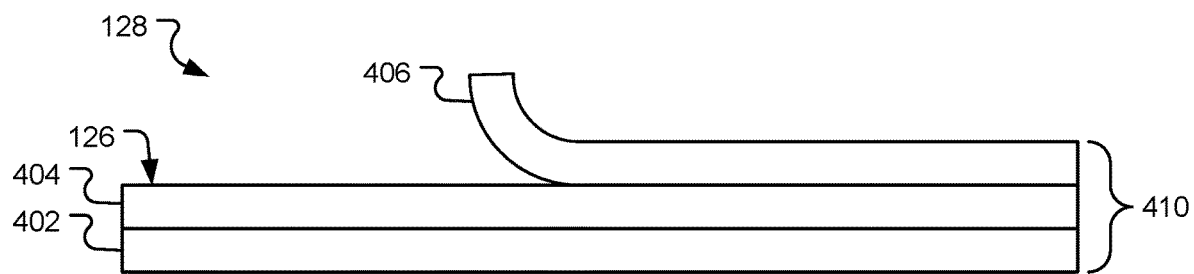
FIG. 4 is a block diagram of a composite workpiece during a manufacturing stage.

Referring to FIG. 4, the composite workpiece 128 is depicted during a manufacturing stage. In an embodiment, the composite workpiece may be a pre-preg ply of an aircraft component, such as a wing. The composite workpiece 128 may include multiple layers 410. After each layer is deposited, it may be inspected for anomalies, including contaminants, before the next layer is deposited. For example, after a layer 404 is placed over another layer 402, the surface 126 of the composite workpiece 128, including the layer 404, may be inspected by scanning and analyzing each of the locations 120-124 to determine a type or condition of material for each of the locations 120-124 as described herein. After a determination that for each of the locations 120-124, the type or condition of material excludes contaminants, the layer 406 may be placed over the layer 404.

In that way, the composite workpiece may be subjected to an in-process inspection during its manufacture.

Figure 5:
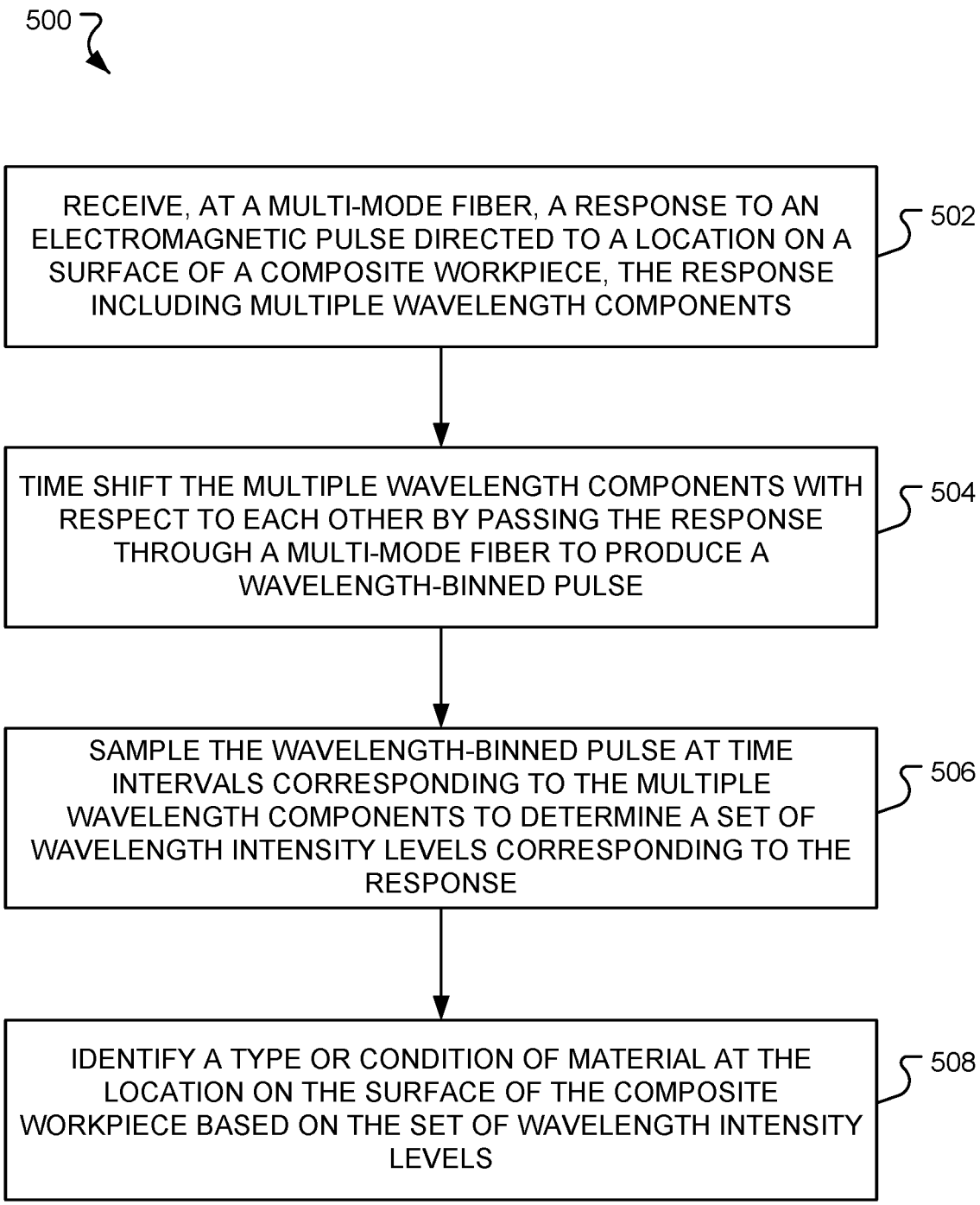
FIG. 5 is a flow chart of an embodiment of a method for spectral sensing.

Referring to FIG. 5, an embodiment of a method 500 for spectral sensing is depicted. The method 500 may include receiving, at a multi-mode fiber, a response to an electromagnetic pulse directed to a location on a surface of a composite workpiece, the response including multiple wavelength components, at 502. For example, the multi-mode fiber 160 may receive the response 132 to the first electromagnetic pulse 110 directed to the first location 120 on the surface 126 of the composite workpiece 128.

The method 500 may further include time shifting the multiple wavelength components with respect to each other by passing the response through a multi-mode fiber to produce a wavelength-binned pulse, at 504. For example, the wavelength components 134-136 may be time shifted with respect to one another to produce the wavelength-binned pulse 162.

The method 500 may also include sampling the wavelength-binned pulse at time intervals corresponding to the multiple wavelength components to determine a set of wavelength intensity levels corresponding to the response, at 506. For example, the wavelength-binned pulse 162 may be sampled by the detector 170 at intervals 314, 315, and 316 to determine the set of wavelength intensity levels 174-176.

The method 500 may include identifying a type or condition of material at the location on the surface of the composite workpiece based on the set of wavelength intensity levels, at 508. For example, a type or conditions of material (e.g., one of the types and conditions of material 212-218 may be identified at the first location 120 based on the set of wavelength intensity levels 174-176.

Although various embodiments have been shown and described, the present disclosure is not so limited and will be understood to include all such modifications and variations as would be apparent to one skilled in the art.

What is claimed is:

1. A method comprising:
    scanning a surface of a composite workpiece with multiple electromagnetic pulses, each of the multiple electromagnetic pulses being associated with a respective location on the surface of the composite workpiece;
    for each respective location on the surface of the composite workpiece:
        receiving a response to one of the multiple electromagnetic pulses at a multi-mode fiber, the response including multiple wavelength components;
        time shifting the multiple wavelength components with respect to each other by passing the response through the multi-mode fiber to produce a wavelength-binned pulse;
        sampling the wavelength-binned pulse at time intervals corresponding to the multiple wavelength components to determine a set of wavelength intensity levels corresponding to the multiple wavelength components;
        identifying a type or condition of material at the respective location on the surface of the composite workpiece based on the set of wavelength intensity levels; and
        generating an image of the surface of the composite workpiece indicating the type or condition of material for each respective location on the surface of the composite workpiece.

2. The method of claim 1, further comprising:
    identifying anomalies on the surface of the composite workpiece based on the type or condition of material for each respective location and superimposing graphical indicators of the anomalies on a visible image of the surface of the composite workpiece.

3. The method of claim 1, further comprising:
    synchronizing a modulation period of a source of the multiple electromagnetic pulses with a duration of the wavelength-binned pulse for each respective location.

4. The method of claim 1, further comprising:
    spatially dispersing the multiple wavelength components using a diffraction grating system before time shifting the multiple wavelength components; and
    focusing each of the multiple wavelength components into the multi-mode fiber using a lens.

5. The method of claim 1, wherein identifying the type or condition of material at the respective location on the surface of the composite workpiece comprises:
    comparing the set of wavelength intensity levels to stored wavelength intensity levels associated with pre-selected types or conditions of material.

6. The method of claim 1, further comprising:
    in response to determining that, for each respective location on the surface of the composite workpiece, the type or condition of material excludes contaminants, adding a new layer to the composite workpiece.

7. A method comprising:
    receiving, at a multi-mode fiber, a response to an electromagnetic pulse directed to a location on a surface of a composite workpiece, the response including multiple wavelength components;
    time shifting the multiple wavelength components with respect to each other by passing the response through the multi-mode fiber to produce a wavelength-binned pulse;
    sampling the wavelength-binned pulse at time intervals corresponding to the multiple wavelength components to determine a set of wavelength intensity levels corresponding to the response;
    identifying a type or condition of material at the location on the surface of the composite workpiece based on the set of wavelength intensity levels; and
    synchronizing a modulation period of a source of the electromagnetic pulse with a duration of the wavelength-binned pulse.

8. The method of claim 7, further comprising:
    identifying additional types or conditions of material at additional locations on the surface of the composite workpiece using the multi-mode fiber; and
    generating an image of the surface of the composite workpiece that includes graphical indicators indicating the type or condition of material at the location and indicating the additional types or conditions of material at the additional locations.

9. The method of claim 8, further comprising:
    identifying anomalies on the surface of the composite workpiece based on the type or condition of material for each respective location and superimposing graphical indicators of the anomalies on a visible image of the surface of the composite workpiece.

10. The method of claim 7, further comprising:
    spatially dispersing the multiple wavelength components using a diffraction grating system before time shifting the multiple wavelength components; and
    focusing each of the multiple wavelength components into the multi-mode fiber using a lens.

11. The method of claim 7, wherein identifying the type or condition of material at the location on the surface of the composite comprises:

comparing the set of wavelength intensity levels to stored wavelength intensity levels associated with pre-selected types or conditions of material.

12. A spectral sensing system comprising:
a multi-mode fiber configured to receive a response to an electromagnetic pulse directed to a location on a surface of a composite workpiece, the response including multiple wavelength components, and to time shift the multiple wavelength components with respect to each other to produce a wavelength-binned pulse;
a detector configured to sample the wavelength-binned pulse at time intervals corresponding to the multiple wavelength components to determine a set of wavelength intensity levels corresponding to the multiple wavelength components;
a processor configured to identify a type or condition of material at the location on the surface of the composite workpiece based on the wavelength intensity levels; and
a mirror system configured to scan the surface of the composite workpiece to enable the multi-mode fiber to receive additional responses for identifying types or conditions of material at additional locations on the surface of the composite workpiece using the multi-mode fiber.

13. The system of claim 12, wherein the processor is further configured to generate an image of the surface of the composite workpiece that indicates the type or condition of material at the location on the surface of the composite workpiece.

14. The system of claim 12, further comprising a source of the electromagnetic pulse, wherein the source includes a red-green-blue (RGB) laser source, a white light laser source, a light emitting diode source, an arc lamp, or combinations thereof.

15. The system of claim 12, wherein a modulation period of the source of the electromagnetic pulse is synchronized with a duration of the wavelength-binned pulse.

16. The system of claim 12, further comprising:
a diffraction grating system for spatially dispersing the multiple wavelength components.

17. The system of claim 12, further comprising:
a lens configured to focus the multiple wavelength components into the multi-mode fiber.

18. The system of claim 12, wherein the composite workpiece is a pre-preg ply of an aircraft wing.

19. The method of claim 12, further comprising:
synchronizing a modulation period of a source of the multiple electromagnetic pulses with a duration of the wavelength-binned pulse for each respective location.

20. The method of claim 13, wherein the processor is further configured to identify anomalies on the surface of the composite workpiece based on the type or condition of material for each respective location and superimpose graphical indicators of the anomalies on a visible image of the surface of the composite workpiece.

* * * * *